United States Patent
Li et al.

(10) Patent No.: US 11,590,476 B2
(45) Date of Patent: Feb. 28, 2023

(54) FREE-STANDING POROUS CARBON FIBROUS MATS AND APPLICATIONS THEREOF

(71) Applicant: Agency for Science, Technology and Research, Singapore (SG)

(72) Inventors: Xu Li, Singapore (SG); Suxi Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 319 days.

(21) Appl. No.: 16/994,216

(22) Filed: Aug. 14, 2020

(65) Prior Publication Data

US 2021/0046445 A1 Feb. 18, 2021

(30) Foreign Application Priority Data

Aug. 15, 2019 (SG) .......................... 10201907523W

(51) Int. Cl.
| | |
|---|---|
| *B01J 20/20* | (2006.01) |
| *B01J 20/02* | (2006.01) |
| *B01J 20/28* | (2006.01) |
| *C02F 1/28* | (2023.01) |
| *C02F 1/461* | (2023.01) |
| *C02F 1/467* | (2023.01) |
| *C02F 101/30* | (2006.01) |

(52) U.S. Cl.
CPC ............ *B01J 20/20* (2013.01); *B01J 20/0225* (2013.01); *B01J 20/0229* (2013.01); *B01J 20/0244* (2013.01); *B01J 20/28007* (2013.01); *B01J 20/28011* (2013.01); *B01J 20/28028* (2013.01); *B01J 20/28033* (2013.01); *C02F 1/288* (2013.01); *C02F 1/4672* (2013.01); *C02F 1/46109* (2013.01); *C02F 1/281* (2013.01); *C02F 1/283* (2013.01); *C02F 2001/46133* (2013.01); *C02F 2001/46161* (2013.01); *C02F 2101/30* (2013.01); *C02F 2201/46115* (2013.01)

(58) Field of Classification Search
CPC .... B01J 20/20; B01J 20/0225; B01J 20/0229; B01J 20/0244; B01J 20/28007; B01J 20/28011; B01J 20/28028; B01J 20/28033; C02F 1/288; C02F 1/46109; C02F 1/4672; C02F 1/281; C02F 1/283; C02F 2001/46133; C02F 2001/46161; C02F 2101/30; C02F 2201/46115
USPC ......................................................... 502/1
See application file for complete search history.

(56) References Cited

U.S. PATENT DOCUMENTS

| 9,546,091 B2 | 1/2017 | Yang et al. |
| 2012/0211367 A1 | 8/2012 | Vecitis |

FOREIGN PATENT DOCUMENTS

WO 2017123162 A1 7/2017

OTHER PUBLICATIONS

Gao et al., "CNT-PVDF Composite Flow-Through Electrode For Single-Pass Sequential Reduction—Oxidation," Journal of Materials Chemistry A, vol. 2, 2014, pp. 6185-6190.
Liu et al., "A Graphene-Based Electrochemical Filter for Water Purification," Journals of Materials Chemistry A, vol. 2, 2014, pp. 16554-16562.
Greiner et al., "Electrospinning: A Fascinating Method for the Preparation of Ultrathin Fibers," Angewandte Chemie International Edition, vol. 46, 2007, pp. 5670-5703.
Chaikittisilp et al., "A New Family of Carbon Materials: Synthesis of MOF-Derived Nanoporous Carbons and Their Promising Applications," Journal of Materials Chemistry A, vol. 1, 2013, pp. 14-19.
Torad et al., "Direct Synthesis of MOF-Derived Nanoporous Carbon with Magnetic Co Nanoparticles Toward Efficient Water Treatment," Small, vol. 10, No. 10, 2014, pp. 2096-2107.
Suktha et al., "Electrospinning of Carbon-Carbon Fiber Composites for High-Performance Single Coin-Cell Supercapacitors: Effects of Carbon Additives and Electrolytes," Industrial & Engineering Chemistry Research, vol. 56, 2017, pp. 10078-10086.
Liu et al., "Electrospun ZIF-Based Hierarchical Carbon Fiber as an Efficient Electrocatalyst for the Oxygen Reduction Reaction," Journal of Materials Chemistry A, vol. 5, 2017, pp. 1211-1220.
Jiang et al., "From Metal-Organic Framework to Nanoporous Carbon: Toward a Very High Surface Area and Hydrogen Uptake," Journal of the American Chemical Society, vol. 133, 2011, pp. 11854-11857.

(Continued)

*Primary Examiner* — Edward M Johnson
(74) *Attorney, Agent, or Firm* — Shackelford, Bowen, McKinley & Norton, LLP

(57) ABSTRACT

A method of producing a porous carbon composite fibrous mats formed of a network of carbon fibers incorporated with porous carbon particles. The method includes electrospinning a polymer solution to form a porous layer of polymeric fibers and the polymeric fibers are doped with a precursor of conductive metal particles, wherein the polymer solution includes a polymer and the precursor of the conductive metal particles, electrospraying a metal organic framework suspension onto the porous layer of polymeric fibers, wherein the metal organic framework suspension includes metal organic framework particles, repeating the electrospinning and electrospraying in an alternating manner to form a porous network of polymeric fibers incorporated with the metal organic framework particles, and heating the porous network of polymeric fibers incorporated with the metal organic framework particles to form the porous carbon composite fibrous mats. The porous carbon composite fibrous mats and its applications thereof are also disclosed herein.

12 Claims, 12 Drawing Sheets

(56) References Cited

OTHER PUBLICATIONS

Chen et al., "Electrospun Polymer Nanofibers Decorated with Noble Metal Nanoparticles for Chemical Sensing," Nanoscale Research Letters, 2017, pp. 1-15.

FREE-STANDING POROUS CARBON FIBROUS MATS AND APPLICATIONS THEREOF

CROSS-REFERENCE TO RELATED APPLICATION

This application claims the benefit of priority of Singapore Patent Application No. 10201907523W, filed 15 Aug. 2019, the content of it being hereby incorporated by reference in its entirety for all purposes.

TECHNICAL FIELD

The present disclosure relates to a method of producing a porous carbon composite fibrous mats comprised of a network of carbon fibers incorporated with porous carbon particles. The present disclosure also relates to the porous carbon composite fibrous mats and its applications thereof.

BACKGROUND

A large number of small organic compounds (SOCs) can be detected in aquatic environments. Such pollutants, especially those associated with antibiotics and various toxic organic compounds in urban waters have generated worldwide public health concerns as they tend to be ubiquitous, persistent, and may disrupt the endocrine systems of aquatic organisms.

Conventional water treatment technologies may not be sufficiently effective for their removal and/or degradation. Other treatment technologies, such as reverse osmosis (RO) or advanced oxidation processes (AOPs), may be effective only to a certain extent, and suffer from intensive energy requirement (1-10 kW hr/m$^3$). In addition, the operational efficacy of RO and AOPs tend to drop significantly in the presence of natural organic matter due to membrane fouling and strong oxidant scavenging. Addressing these limitations may require innovative treatment technologies that effectively remove these contaminants from drinking water at lower cost and less energy.

Recently, a flow-through electrochemical filtration system which employs carbon nanotube (CNT) and/or graphene membranes as electrode materials has been developed to remove organic contaminants in water through physical absorption and electrooxidation. The strategy is based on an electrochemical approach to reduce filter fouling rates by in situ foulant destruction, which in turn reduces the frequency of physical and/or chemical cleanings needed to maintain optimal permeability. The electrochemical filtration system may be advantageous compared to batch electrochemical oxidation processes due to the liquid flow through the electrode resulting in convection-enhanced transfer of the target molecule to the electrode surface. The energy consumption for this electrochemical filter was calculated to be 0.7 kW hr/kg COD and/or 0.084 kW hr/m$^3$, which are much lower than electrochemical oxidation processes (4-100 kW hr/kg COD and/or 1-10 kW hr/m$^3$). However, certain technological issues may have limited the scaling up of such flow-through electrochemical filtration system.

Firstly, the properties of graphene and/or CNT macrostructures in the electrode membrane, such as electrical conductivity and mechanical strength, remain far lower than the properties of individual graphene or CNT. The CNT membrane may be fragile, easily torn apart and fractured. Moreover, agglomeration of CNTs was observed after an extended period of operation. Secondly, the potential release of the fragile graphene/CNT from the filtration system into water bodies causes serious environmental and potential human health risks because of its aerodynamic shape. Thirdly, although mass production of both graphene and CNT have made significant progress, the high cost of these materials restricts commercialization of this technology. Therefore, it remains a challenge to develop a scalable, low-cost and mechanically stable electrochemical filter for aqueous organic contaminants adsorption and degradation, which may at least overcome the drawbacks of the current CNT and/or graphene electrochemical filter.

There is thus a need to provide for a solution that addresses one or more of the limitations mentioned above. The solution should at least provide for a method of producing a porous carbon composite fibrous mats.

SUMMARY

In a first aspect, there is provided for a method of producing a porous carbon composite fibrous mats formed of a network of carbon fibers incorporated with porous carbon particles, the method includes:

electrospinning a polymer solution to form a porous layer of polymeric fibers and the polymeric fibers are doped with a precursor of conductive metal particles, wherein the polymer solution includes a polymer and the precursor of the conductive metal particles;

electrospraying a metal organic framework suspension onto the porous layer of polymeric fibers, wherein the metal organic framework suspension includes metal organic framework particles;

repeating the electrospinning and electrospraying in an alternating manner to form a porous network of polymeric fibers incorporated with the metal organic framework particles; and heating the porous network of polymeric fibers incorporated with the metal organic framework particles to form the porous carbon composite fibrous mats.

In another aspect, there is provided for a porous carbon composite fibrous mats including:

a network of carbon fibers incorporated with porous carbon particles, wherein the carbon fibers are doped with conductive metal particles, and wherein the porous carbon particles are doped with nano-sized metal particles derived from a metal organic framework.

In another aspect, there is provided for the use of the porous carbon composite fibrous mats as described in the above aspect for gas adsorption in food packaging, or as a gas scavenger in food packaging, or as an electrode in electrochemical treatment of water, or as an electrode for energy storage or energy conversion.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which.

DETAILED DESCRIPTION

Figure 1A:
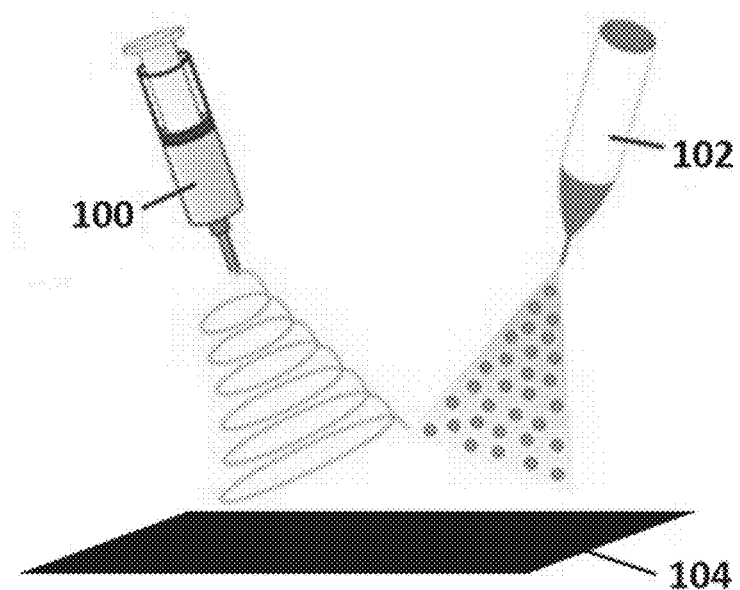
FIG. 1A shows a schematic illustration of the present alternating electrospinning and electrospraying method. The polymer solution for electrospinning the fibers is denoted 100, the MOF particles suspension for electrospraying is denoted 102, and the substrate for collecting the electrospun fibers integrated with the electrosprayed MOF particles is denoted 104. The substrate is interchangeably termed herein the "collector".
Figure 1B:
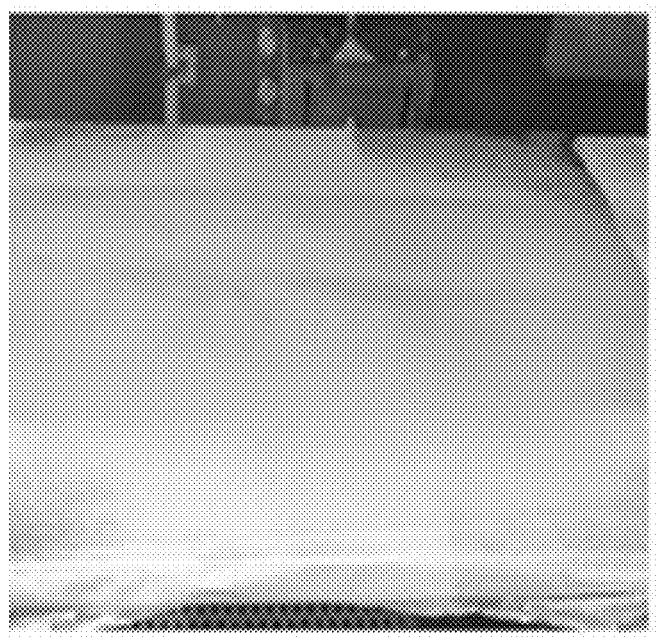
FIG. 1B shows a photograph of the electrospun Fe(acac)$_3$/PAN fibrous mat from the present method. Fe(acac)$_3$ denotes tris(acetylacetonato)iron(III) and PAN denotes polyacrylonitrile.
Figure 1C:
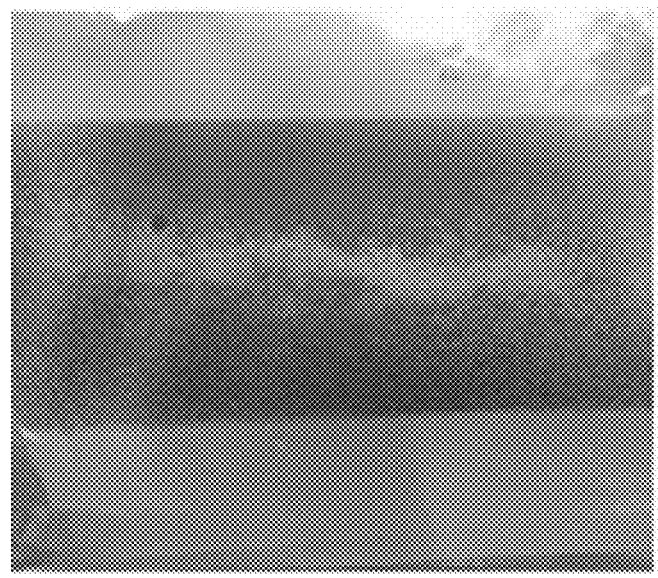
FIG. 1C shows a photograph of zeolitic imidazolate framework-67 (ZIF-67) particles deposited on the electrospun fibrous mats by electrospraying.

The following detailed description refers to the accompanying drawings that show, by way of illustration, specific details and embodiments in which the present disclosure may be practiced.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method of fabricating a porous carbon fibrous mats which involves integration of metal organic framework (MOF) particles into electrospun fibers through an alternating process of electrospinning and electrospraying, followed by heat treatment. The heat treatment may include a pyrolysis process.

Electrospinning may be a straightforward and versatile technique for generating continuous strands of nanofibers from a solution containing one or more polymers. After heat treatment and carbonization, the resulting electrospun carbon nanofibers may form free-standing mats that have desirable electrical conductivity and mechanical property. However, the specific surface area and porosity of electrospun carbon fibers unfortunately remain relatively low for adsorption of small organic contaminants for the electrospun carbon fibers to be used or operable in water treatment applications.

A conventional means to address the deficiencies of electrospun fibers may be to incorporate porous MOF particles, or other particles such as active carbon, carbon spheres, etc., into the polymer solution for electrospinning the nanofibers. For example, during heat treatment and carbonization of the electrospun polymer nanofibers, thermal decomposition of metal organic frameworks (MOFs) may be included as a facile route to synthesize nanoporous MOF-derived carbon particles with large internal surface area and high porosity. Conventionally, through a one-step carbonization of zeolitic imidazolate framework-67 (ZIF-67) crystals, micro-mesoporous carbon particles with a high specific surface area of 400-500 $m^2/g$, which exhibited excellent adsorption performance towards organic dye in pollutant water, may be developed. Unfortunately, the porous particles were embedded and/or encapsulated in the resultant electrospun fibers and the surface area of fibrous mats prepared from such electrospun fibers was not even desirably improved. The present method addresses one or more of the limitations described above.

The present method employs an alternating process of electrospinning and electrospray technique to trap highly porous MOF particles into electrospun fibrous mats without blockage of pores. Said differently, the present method includes a step of electrospinning the fibers and a step electrospraying the MOF particles onto the fibers, in an alternating manner. After heat treatment, the fibrous mats with MOF particles integrated get converted to free-standing porous carbon fibrous mats with desirably improved specific surface area, electrical conductivity, and mechanical property, which may be directly operable or directly used as electrochemical filters to remove organic contaminants in water via physical adsorption and electrooxidation.

The porous carbon fibrous mats produced from the present method is a free-standing hybrid porous carbon material that has high porosity, desirable electrical conductivity, and can be operable or used as an electrode material in electrochemical water treatment system to remove contaminants by physical adsorption and electrochemical degradation. The resultant porous carbon fibrous mats may be referred herein interchangeably as a hybrid porous carbon material, as hybrid porous carbon fibrous mats, and as porous carbon composite fibrous mats. The porous carbon composite fibrous mats are referred to as a hybrid or composite material not just because of the presence of carbon fibers and carbon particles, but also because metal components are present apart from carbon.

Details of various aspects and embodiments of the present method and present porous carbon composite fibrous mats, and their advantages associated with the various aspects and embodiments are described below. Where advantages have been demonstrated in the examples, they shall not be iterated for brevity.

In the present disclosure, there is provided for a method of producing a porous carbon composite fibrous mats formed of a network of carbon fibers incorporated with porous carbon particles, the method may include electrospinning a polymer solution to form a porous layer of polymeric fibers and the polymeric fibers may be doped with a precursor of conductive metal particles. The polymer solution may include a polymer and the precursor of the conductive metal particles. The present method also includes electrospraying a metal organic framework suspension onto the porous layer of polymeric fibers, wherein the metal organic framework suspension includes metal organic framework particles. The present method includes repeating the electrospinning and electrospraying in an alternating manner to form a porous network of polymeric fibers incorporated with the metal organic framework particles, and heating the porous network of polymeric fibers incorporated with the metal organic framework particles to form the porous carbon composite fibrous mats. By proceeding in an alternating manner, the metal organic framework particles do not get embedded entirely in or encapsulated in the polymeric fibers. Subsequently, with pyrolysis to carbonized the polymeric fibers and metal organic framework particles, the carbon particles carbonized from the metal organic framework particles are present in pores of the resultant mats and not embedded/encapsulated in the carbon fibers. Said differently, the metal organic framework-derived carbon particles are not present in the carbon fibers forming the mats, but are trapped within the mats. The terms "polymeric fibers" and "polymer fibers" are exchangeably used herein.

In the present method, electrospinning the polymer solution may include mixing the polymer and the precursor of conductive metal particles in an organic solvent to form the polymer solution. The present method is advantageous as additional solvents and complicated electrospinning setup are not required to accommodate the precursor of the conductive metal particles for electrospinning.

The polymer may consist or may include polyacrylonitrile, phenolic resins, polypyrrole, polystyrene, polymethylacrylonitrile, polyaromatic hydrocarbons, biomass-derived polymers, or a combination thereof. Advantageously, such polymers have high carbon content for high carbon conversion and/or high carbon fiber production.

The precursor of conductive metal particles may consist or may include tris(acetylacetonato)iron(III), iron(III) acetate, iron(III) nitrate, copper(II) acetate, or copper(II) nitrate. The precursor of the conductive metal particles provide for conductive metal particles to be disposed on or embedded in the electrospun polymeric fibers and hence the resultant carbon fibers. The presence of conductive metal particles not only improves electrical conductivity of the polymer solution for electrospinning, but also increases the electrical conductivity of the resultant carbon fibers for rendering better electrochemical performance in electrochemical water treatment systems.

The organic solvent may consist or may include N,N-dimethylformamide (DMF), acetone, dimethyl sulfoxide (DMSO), tetrahydrofuran (THF), or ethanol. Advantageously, such organic solvents are volatile for drying the electrospun polymeric fibers.

In the present method, electrospraying the metal organic framework suspension may include mixing (i) a precursor of the metal organic framework particles and (ii) an alkyl substituted imidazole, a bicyclic imidazole, or a non-substituted imidazole to form the metal organic framework particles. The terms "metal organic framework particles" and "metal organic framework crystals" are exchangeably used herein.

The precursor of the metal organic framework particles may consist or may include cobalt chloride, cobalt acetate, cobalt hydroxide, cobalt oxide, cobalt sulfate, cobalt carbonate, cobalt nitrate hexahydrate, zinc chloride, zinc acetate, zinc hydroxide, zinc oxide, zinc sulfate, zinc carbonate, or zinc nitrate hexahydrate.

The alkyl substituted imidazole may consist or may include 1-methylimidazole, 2-methylimidazole, or 2-ethylimidazole. The bicyclic imidazole may consist or may include benzimidazole.

The metal organic framework particles may consist or may include a zeolitic imidazolate framework (ZIF). The zeolitic imidazolate framework may consist or may include zeolitic imidazolate framework-67 (ZIF-67) or zeolitic imidazolate framework-8 (ZIF-8). The zeolitic imidazolate framework may also consist or include any one of ZIF-60 to ZIF-82, ZIF-90, ZIF-95, and/or ZIF-100.

The metal organic framework particles each may have a diameter ranging from 20 nm to 10 μm, 50 nm to 10 μm, 100 nm to 10 μm, 500 nm to 10 μm, 1000 nm to 10 μm, 5 μm to 10 μm, etc. The term diameter herein refers to the maximal length of a line segment passing through the center and connecting two points on the periphery of a spherical particle or a particle which is not a perfect sphere. Advantageously, such diameters provide for high surface area and yet can be incorporated or trapped in the fibrous polymer mat that was electrospun.

In the present method, electrospraying the metal organic framework suspension may further include adding a porous additive to the metal organic framework suspension before electrospraying, wherein the porous additive may consist or may include a metal organic framework, porous coordination polymers, active carbon particles, carbon spheres, zeolites, molecular sieves, microporous phosphates, or a combination thereof. Such porous additives may be used to increase the microporosity and mesoporosity of the resultant porous carbon composite fibrous mats. The metal organic framework for the porous additive may be a different metal organic framework used to form the metal organic framework suspension for electrospraying. Active carbon particles differ from carbon spheres in that the active carbon particles herein refer to irregular-shaped carbon particles having high surface area and various pore size distribution. Such porous additives may not convert to carbon particles after pyrolysis, which distinguishes the carbon particles used as the porous additives from carbon particles formed (e.g. carbonized) from the metal organic framework particles.

In the present method, heating the porous network of polymeric fibers may include subjecting the porous network of polymeric fibers incorporated with the metal organic framework particles to pyrolysis at a temperature ranging from 500° C. to 1200° C., 800° C. to 1200° C., 1000° C. to 1200° C., 500° C. to 1000° C., 800° C. to 1000° C., 500° C. to 1000° C., etc. These temperatures render complete carbonization of the polymeric fiber and MOF without compromising the high electrical conductivity.

The present disclosure also provides for a porous carbon composite fibrous mats that may include a network of carbon fibers incorporated with porous carbon particles, wherein the carbon fibers may be doped with conductive metal particles, and wherein the porous carbon particles may be doped with nano-sized metal particles derived from a metal organic framework.

Embodiments and advantages described for the present method of the first aspect can be analogously valid for the present porous carbon composite fibrous mats subsequently described herein, and vice versa. As the various embodiments and advantages have already been described above and demonstrated in the examples herein, they shall not be iterated for brevity.

In the porous carbon composite fibrous mats, the conductive metal particles may be disposed on or embedded in the carbon fibers. As described above, the conductive metal particles may be mixed in the polymer solution and electrospun together to form the polymeric fibers, which can be subsequently carbonized into the electrospun carbon fibers to form the carbon fibrous mats. The conductive metal particles may consist or may include iron, copper, tin, or titanium. The conductive metal particle embedded in the carbon fiber enhances the electrical conductivity of the resultant carbon fibrous mat.

In the porous carbon composite fibrous mats, the porous carbon particles each may have a diameter ranging from 10 nm to 10 μm, 50 nm to 10 μm, 100 nm to 10 μm, 500 nm to 10 μm, 1000 nm to 10 μm, 5 μm to 10 μm, etc. Advantageously, such diameters provide for high surface area and yet can be incorporated or trapped in the fibrous polymer mat that was electrospun. The porous carbon particles may be carbonized (i.e. derived) from the metal organic framework particles.

The metal organic framework may consist or may include a zeolitic imidazolate framework, and wherein the zeolitic imidazolate framework may consist or may include zeolitic imidazolate framework-67 or zeolitic imidazolate framework-8. Other aspects and embodiments of the metal organic framework and zeolitic imidazolate framework are already described above and shall not be iterated for brevity.

In various aspects and embodiments, each of the porous carbon particles doped with the nano-sized metal particles may have a larger diameter than each of the nano-sized metal particles doped thereon, wherein the nano-sized metal particles each may have a diameter in the range of 5 nm to 200 nm, 10 nm to 200 nm, 50 nm to 200 nm, 100 nm to 200 nm, 150 nm to 200 nm, etc. Advantageously, such diameters provide a high surface area for improved electrooxidation performance. The nano-sized metal particles are derived from the metal organic framework particles. During pyrolysis, the metal elements or components in the metal organic framework particles may not get converted to carbon as the metal may be able to withstand the high temperatures used in pyrolysis and hence becomes nano-sized metal particles disposed on the carbon particles that were carbonized from the metal organic framework particles. The nano-sized metal particles may be present in or on the metal organic framework-derived carbon particles. The nano-sized metal particles incorporated or trapped in the porous carbon particles derived from MOF provide for higher electrooxidation performance.

In various aspects and embodiments, the porous carbon composite fibrous mats may further include a porous additive, wherein the porous additive comprises a metal organic framework, porous coordination polymers, active carbon particles, carbon spheres, zeolites, molecular sieves, microporous phosphates, or a combination thereof.

In various aspects and embodiments, the porous carbon composite fibrous mats may be operable for gas adsorption in food packaging, or as a gas scavenger in food packaging, or as an electrode in electrochemical treatment of water, or as an electrode for energy storage or energy conversion.

The present disclosure further provides for use of the porous carbon composite fibrous mats already described above for gas adsorption in food packaging, or as a gas scavenger in food packaging, or as an electrode in electrochemical treatment of water, or as an electrode for energy storage or energy conversion.

Embodiments and advantages described for the present method of the first aspect and the present porous carbon composite fibrous mats of the subsequent aspect can be analogously valid for use of the present porous carbon composite fibrous mats subsequently described herein, and vice versa. As the various embodiments and advantages have already been described above and demonstrated in the examples herein, they shall not be iterated for brevity.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to nanostructured hybrid porous carbon materials. Specifically, the present disclosure provides an approach to fabricate free-standing porous carbon fibrous mats through integration of porous metal organic framework (MOF) particles into electrospun fibers by an alternating electrospinning and electrospraying process followed by heat treatment. The free-standing porous carbon fibrous mats may be termed herein a "porous carbon composite fibrous mat". The developed robust hybrid porous carbon fibrous mats exhibit high specific surface area, micro/mesopore volume, good electrical conductivity, and can be directly applied as binder-free electrode material in a flow-through electrochemical filtration system for water treatment. The developed conductive porous carbon fibrous mats demonstrates good removal efficiency towards various organic contaminants (antibiotics, phenol, dye, etc) in water via physical adsorption and electrooxidative degradation, showing great potential for environmental applications. Moreover, the fabrication process is facile, scalable and cost-effective, can compatibly include other porous additives to prepare various hybrid porous carbon fibrous materials for broader applications that include energy storage/conversion, gas adsorption/scavenge, electrocatalysis, etc.

As described above, the present method to prepare the hybrid porous carbon fibrous mats through integration of porous MOF particles into electrospun fibers involves alternating electrospinning and electrospraying followed by heat treatment.

The electronspun fibers may be polymeric fibers. The polymer used for electrospinning the fibers may be selected from the group consisting of polyacrylonitrile, phenolic resins, polypyrrole, polystyrene, polymethylacrylonitrile, polyaromatic hydrocarbons, a biomass-derived polymer, and a combination thereof.

The present method may include use of other porous additive, which may be selected from the group consisting of metal organic framework, porous coordination polymers, active carbon particles, carbon spheres, zeolites, molecular sieves, microporous phosphates, and a combination thereof.

The present method may produce a free-standing hybrid porous carbon fibrous mat that has both high porosity and desirably good electrical conductivity. The carbon fibers and/or the porous additives in the carbon fibrous mat can be doped or coated with metal or metal oxide nanoparticles. The hybrid porous carbon fibrous mat can be an anode or a cathode material operable for electrochemical water treatment applications, an electrode material operable for energy storage/conversion applications, and can be operable for gas adsorption/scavenge applications in food packaging.

The present method, the present porous carbon composite fibrous mats and its uses, are described in further details, by way of non-limiting examples, as set forth below.

Example 1: Preparation of ZIF-67 Crystals (1-2 μm)

0.45 g cobalt nitrate hexahydrate was dissolved in 12 mL deionized (DI) water. 5.5 g 2-methylimidazole was then dissolved in 80 mL DI water under sonication. These two solutions were then mixed under vigorous stirring at 60° C. and the mixture gradually turned to a milky colloidal dispersion. After 10 mins, stirring was stopped and the mixture was kept at this temperature for 20 hrs. After that, the resulting purple precipitates were collected by centrifuging, washed with water and methanol subsequently for 3 times and finally vacuum-dried at 80° C. for 24 hrs.

Example 2: Preparation of ZIF-8 Crystals (1-2 μm)

Methanolic solutions of zinc nitrate hexahydrate (810 mg, 40 mL) and methanolic solutions of 2-methylimidazole (526 mg, 40 mL) were mixed under stirring. Then, the mixture was transferred into an 125 mL autoclave and was kept at 100° C. for 12 hrs. After that, the resulting white precipitates were collected by centrifuging, washed with methanol subsequently for 3 times and finally vacuum-dried at 80° C. for 24 hrs.

Example 3: Preparation of Present Hybrid Electrospun Fibrous Mats Integrated with MOF Particles 0.5 g tris(acetylacetonato) iron(III) was dissolved in 9.0 g N,N-dimethylformamide (DMF) under stirring. Then, 1.0 g polyacrylonitrile (PAN, molecular weight=150,000) was added to the solution and the mixture was stirred at 70° C. for 2 hrs and then cooled down to room temperature.

0.5 g MOF particles were dispersed in the mixture of 9.5 g DMF and 0.25 g furfuryl alcohol under sonication for 5 mins and stirring at room temperature overnight.

The alternate electrospinning and electrospraying process was conducted using a Nanon-01A horizontal electrospinning setup. Both the polymer solution and the MOF suspension were placed in a 2 mL plastic syringe fitted with a flap tip 22 G needle. Typically, electrospinning of the polymer solution was performed at 18 kV with a feeding rate of 0.6 mL/h and the needle tip-to-plate substrate distance was 10 cm. Electrospraying of the MOF suspension was performed at 30 kV with a feeding rate of 1.0 mL/h and the needle tip-to-plate substrate distance was 5 cm. The hybrid porous fibrous mats were obtained via electrospinning of the polymer solution for 1 hr and electrospraying of the MOF suspension for 1 hrs in an alternating manner.

The final hybrid fibrous mats contain four layers of electrospun fibers and three layers of MOF particles. As non-limiting examples, both ZIF-67 and ZIF-8 can be used.

Example 4: Preparation of Present Hybrid Porous Carbon Fibrous Mats

The hybrid fibrous mats were heated in air at 80° C. for 24 hrs and then at 150° C. for 6 hrs. Finally, the fibrous mats were placed in a tube furnace and pyrolyzed under a flow of argon (200 cm$^3$ STP/min) at 800-1000° C. (temperature ramped at 5° C. min$^{-1}$) for 3 hrs. The heating at 80° C. for 24 hrs and then at 150° C. for 6 hrs can help to stabilize the PAN fiber before carbonization at high temperature.

Example 5: Characterization

Morphology of the MOF particles and hybrid fibrous mats were observed under JEOL JSM 6700 field-emission scanning electron microscope at an accelerating voltage of 5 kV. All samples were coated with a thin gold layer before SEM imaging.

TEM images were obtained with a Philips CM300 FEGTEM high resolution transmission electron microscope.

The specific surface area and pore size analysis was measured using a Micromeritics ASAP 2020 system.

Electrical resistivity of the hybrid carbon fibrous mats was measured using a multimeter.

Example 6: Electrochemical Filtration Setup and Performance Evaluation

The hybrid porous carbon fibrous mat (with a diameter of 3 cm and thickness of 0.25 mm-0.3 mm) was supported by an PTFE membrane ($d_{pore}$=5 µm) and placed into the flow-through electrochemical filtration system. The fluid to be treated flowed first through a perforated titanium cathode, followed by an insulating Si-rubber O-ring that separated the electrodes, and finally an anodic carbon fibrous mat, as shown in FIG. 6A to 6E. The electrochemical filtration system was connected to a power supply which provided a constant potential of 1 V to 3 V. After sealing the filtration casing and priming with DI water, contaminated water was flowed through the filter under a fixed flow rate (0.5-5 mL/min). Effluent aliquots were collected after the effluent composition achieved a steady state (5-10 mins) and analyzed by a Shimadzu 2501PC UV-Vis spectrometer to measure the concentration change of the target compounds at their maximum absorbance wave length.

A linear 5-point calibration curve was established for quantification of the concentration.

Example 7: Discussion of Present Method and Fibrous Mat

As shown in FIG. 1A, the present hybrid porous carbon fibrous mats were fabricated via alternate deposition of polymer fibers by electrospinning and MOF particles by electrospraying on the plate collector, followed by thermal treatment and carbonization process. The polymer demonstrated for electrospinning, without being limited to, was polyacrylonitrile (PAN), which generated free-standing nanofibrous mats with good mechanical strength. Other polymers include, without being limited to, phenolic resins, polypyrrole, polystyrene, polymethylacrylonitrile, polyaromatic hydrocarbons, biomass-derived polymers, or a combination thereof. A certain portion of conductive metal (iron, copper, tin, titanium, etc.) precursors can be incorporated into the polymer solution for electrospinning to increase the electrical conductivity and to tune the electrochemical property of the resultant electrospun carbon fibers.

The MOF crystals used can be based on any kind of MOF. The MOF crystals can have sizes larger than 500 nm to avoid agglomeration in the carbonization process. A small proportion (1-5 wt %) of furfuryl alcohol can be added to the MOF suspension to increase the surface area of MOF-derived porous carbon. Other porous additives can include, without being limited to, porous coordination polymers (PCPs), active carbon particles, carbon spheres, zeolites, molecular sieves, microporous phosphates, or a combination thereof.

Figure 2A:
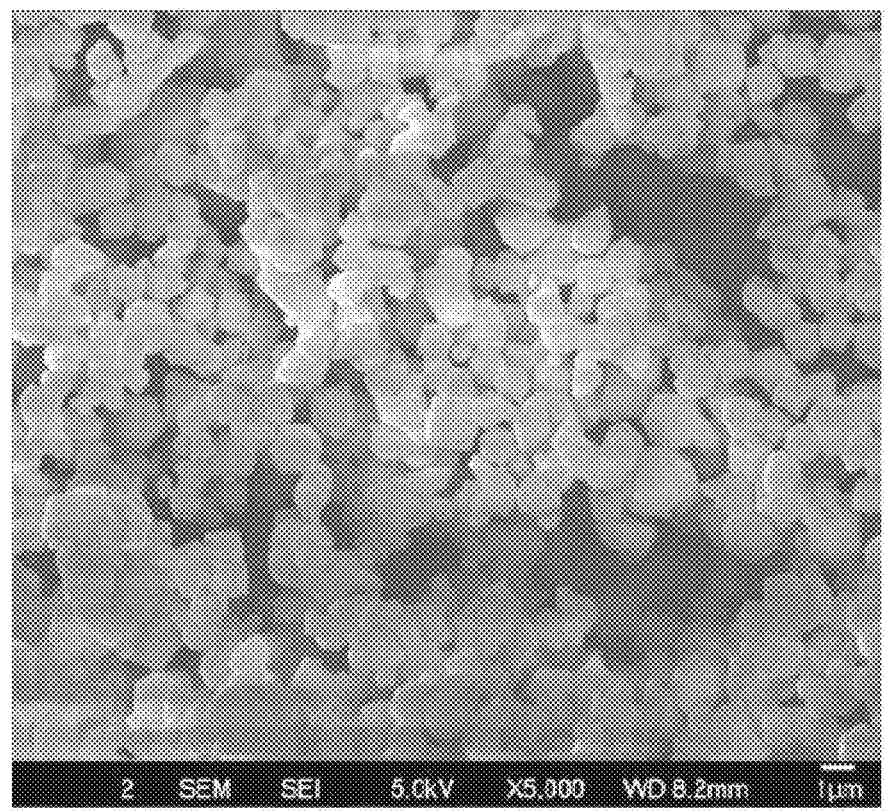
FIG. 2A is a scanning electron microscopy (SEM) image of ZIF-8 crystal particles. The scale bar denotes 1 μm.
Figure 2B:
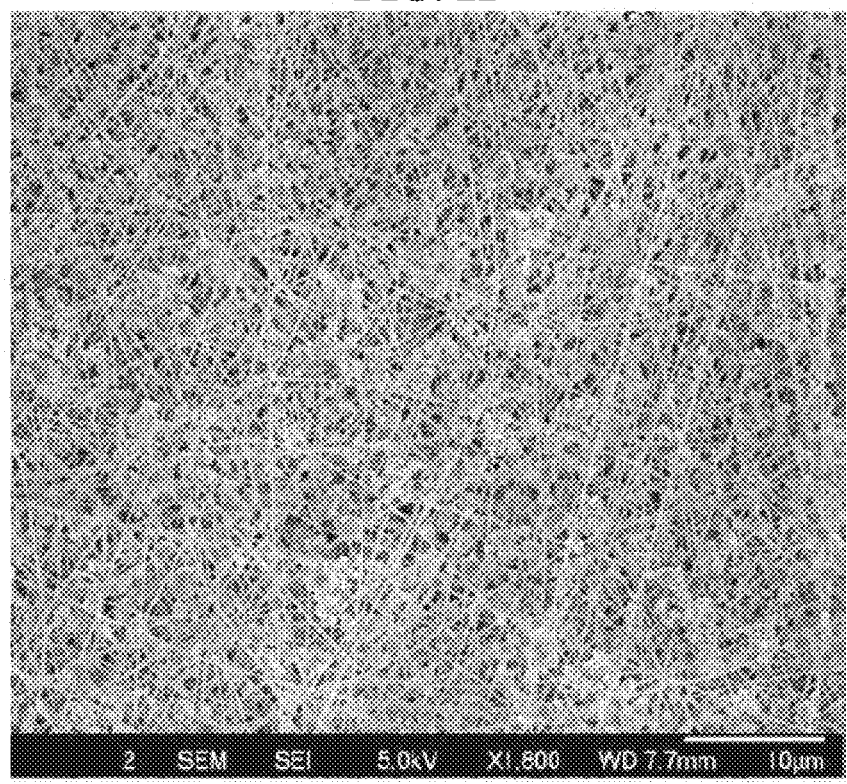
FIG. 2B is a SEM image of a hybrid electrospun fibrous mats integrated with ZIF-8 particles fabricated via the present alternate electrospinning and electrospraying method. Scale bar denotes 10 μm.
Figure 2C:
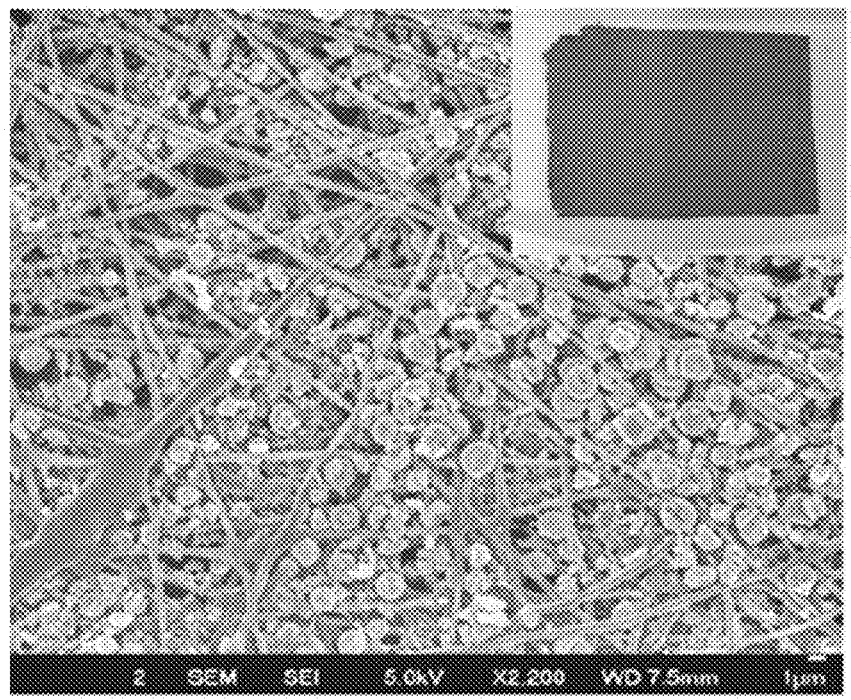
FIG. 2C is a SEM image of a hybrid carbon fibrous mats integrated with ZIF-8-derived porous carbon particles fabricated via the present alternate electrospinning and electrospraying method. The scale bar denotes 1 μm. The inset picture shows a piece of the free-standing hybrid porous carbon fibrous mat.

FIGS. 2A and 2B depicts the SEM images of prepared ZIF-8 crystals with sizes around 1-2 µm and the hybrid electrospun fibrous mats integrated with the ZIF-8 particles fabricated via the present alternate electrospinning and electrospray process. As shown in FIG. 2B, the MOF ZIF-8 particles are uniformly trapped in the electrospun fibrous network, other than embedded in the fibers. The diameters of the electrospun fibers could be controlled at 500-1000 nm through the electrospinning parameters and concentrations of polymer solutions. As shown in FIG. 2C, after further thermal treatment and high temperature (more than 700° C.) carbonization process, the MOF-derived porous carbon particles remain intact without any aggregation and the carbon fibrous network is well maintained.

Figure 3A:
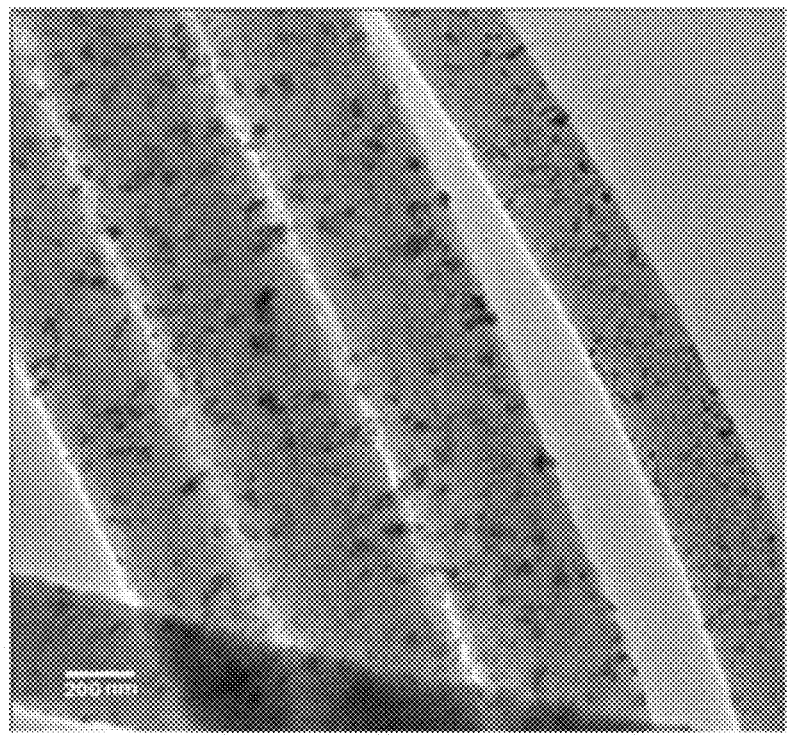
FIG. 3A is a transmission electron microscopy (TEM) image of electrospun Fe-doped carbon fibers. Scale bar denotes 200 nm.
Figure 3B:
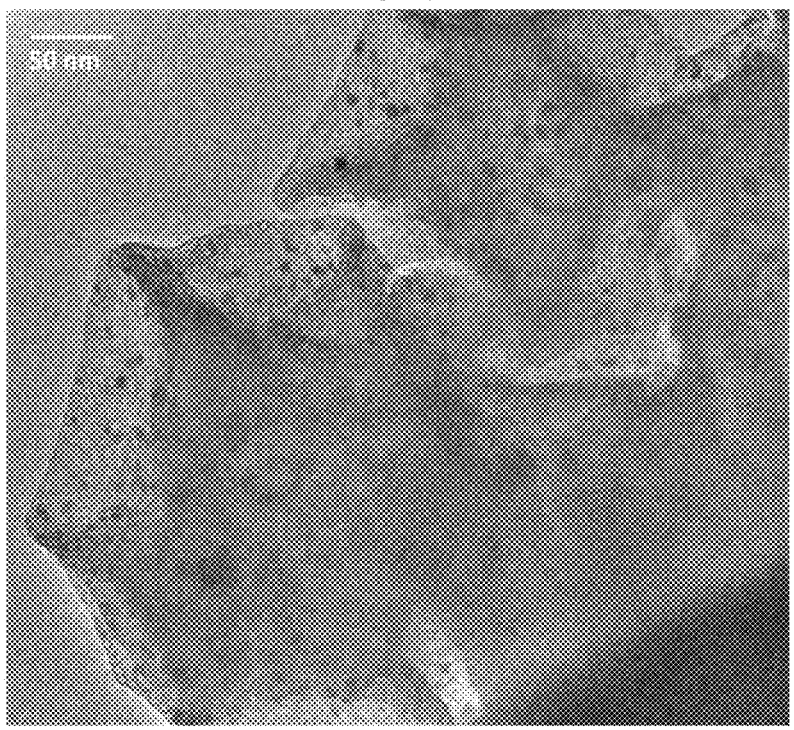
FIG. 3B is a TEM image of the ZIF-8-derived nanoporous carbon particles integrated to the carbon fibers. Scale bar denotes 50 nm.
Figure 3C:
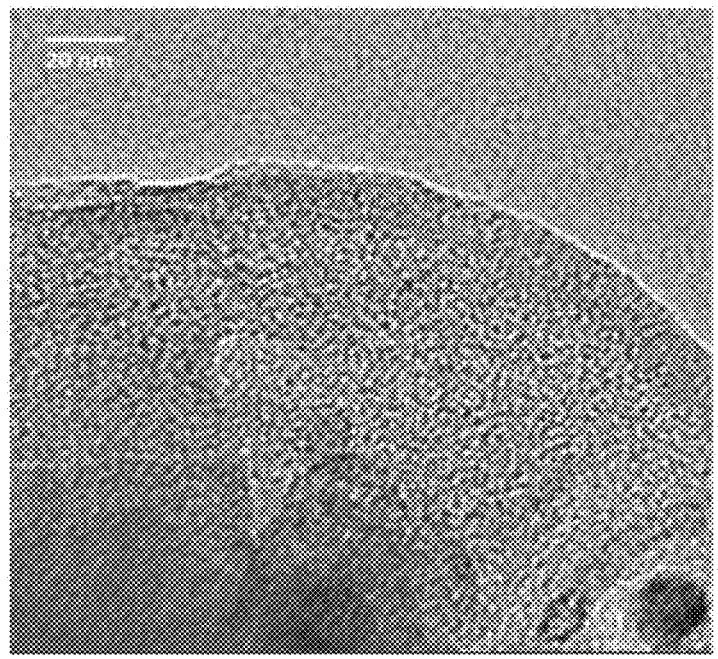
FIG. 3C is a further magnified TEM image of the ZIF-8-derived nanoporous carbon particles. Scale bar denotes 20 nm.

From the TEM image of FIG. 3A, it can be seen that the electrospun carbon fibers are uniformly doped with conductive metal nanoparticles, leading to a low electrical resistance (100-200 ohm) of the resultant hybrid carbon fibrous mats. The TEM images of the MOF-derived porous carbon particles (FIG. 3B to 3C) exhibit numerous micropores and mesopores, which provides abundant active sites for adsorption and electrooxidation of small organic contaminants.

Figure 4A:
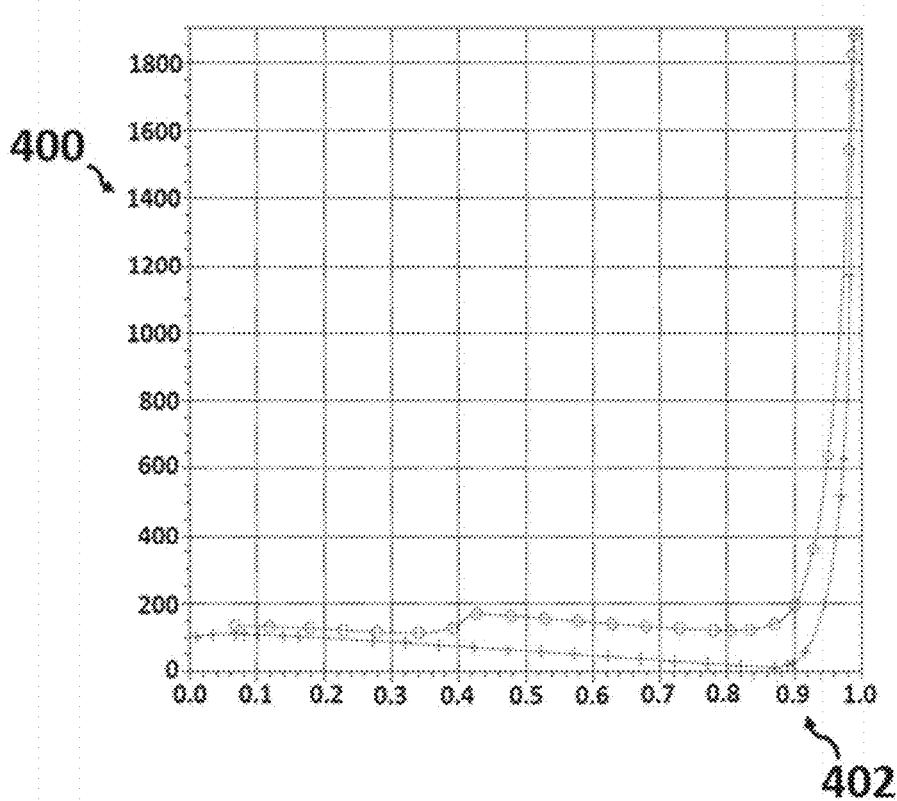
FIG. 4A shows the nitrogen adsorption/desorption isotherms of electrospun Fe/carbon fibrous mats integrated with ZIF-8-derived porous carbon particles fabricated by the present method. The vertical axis 400 denotes quantity adsorbed (cm$^3$/g at STP). The horizontal axis 402 denotes relative pressure (P/P$_o$). The BET surface area was 447 m$^2$/g, total pore volume was 2.91 cm$^3$/g, and micropore volume was 0.287 cm$^3$/g. STP denotes standard temperature and pressure, i.e. 0° C. and 101.3 kPa.
Figure 4B:
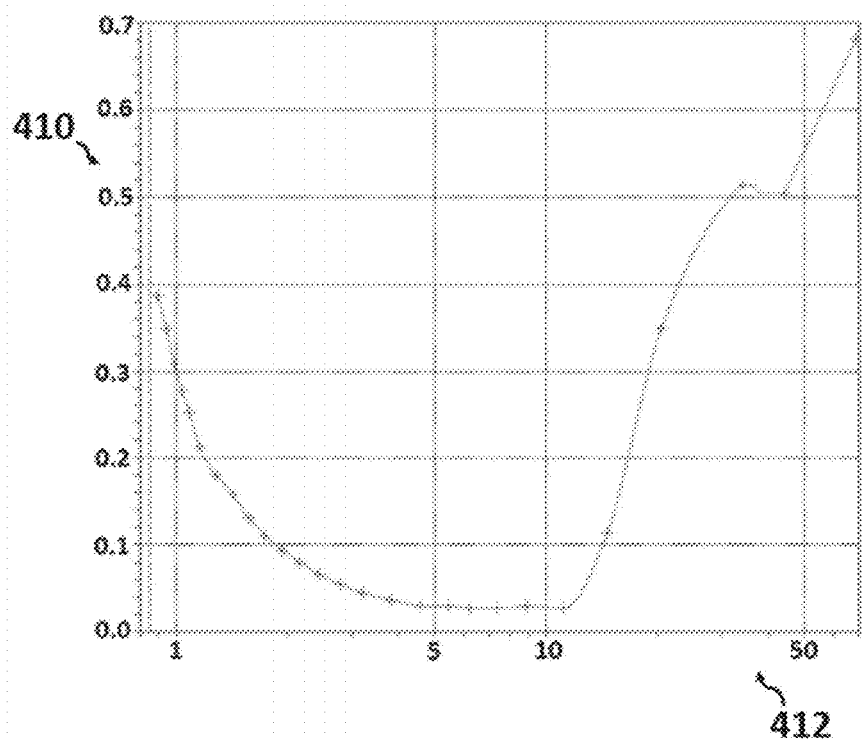
FIG. 4B shows the Barrett-Joyer-Halenda (BJH) pore size distribution of the electrospun Fe/carbon fibrous mats integrated with ZIF-8-derived porous carbon particles. The vertical axis 410 denotes dV/d log(r) Pore Volume (cm$^3$ g$^{-1}$ nm$^{-1}$). The horizontal axis 412 denotes pore size (nm).
Figure 5A:
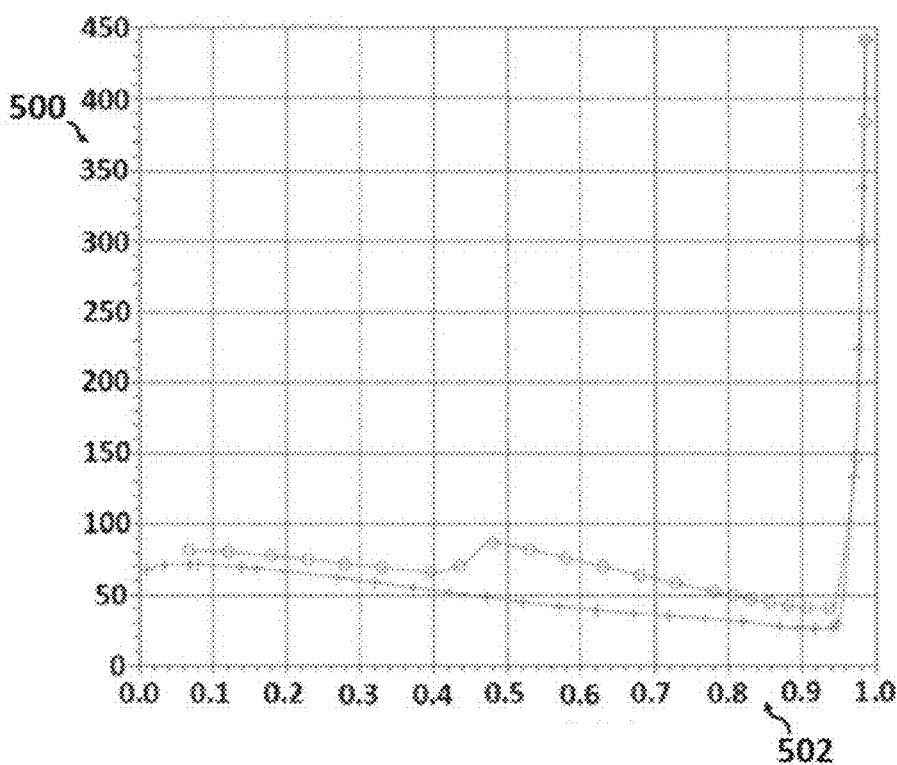
FIG. 5A shows the nitrogen adsorption/desorption isotherms pure electrospun Fe/carbon fibrous mats. The vertical axis 500 denotes quantity adsorbed (cm$^3$/g at standard temperature pressure (STP)). The horizontal axis 502 denotes relative pressure (P/P$_o$). The BET surface area was 164 m$^2$/g, total pore volume was 0.65 cm$^3$/g, and micropore volume was 0.07 cm$^3$/g.
Figure 5B:
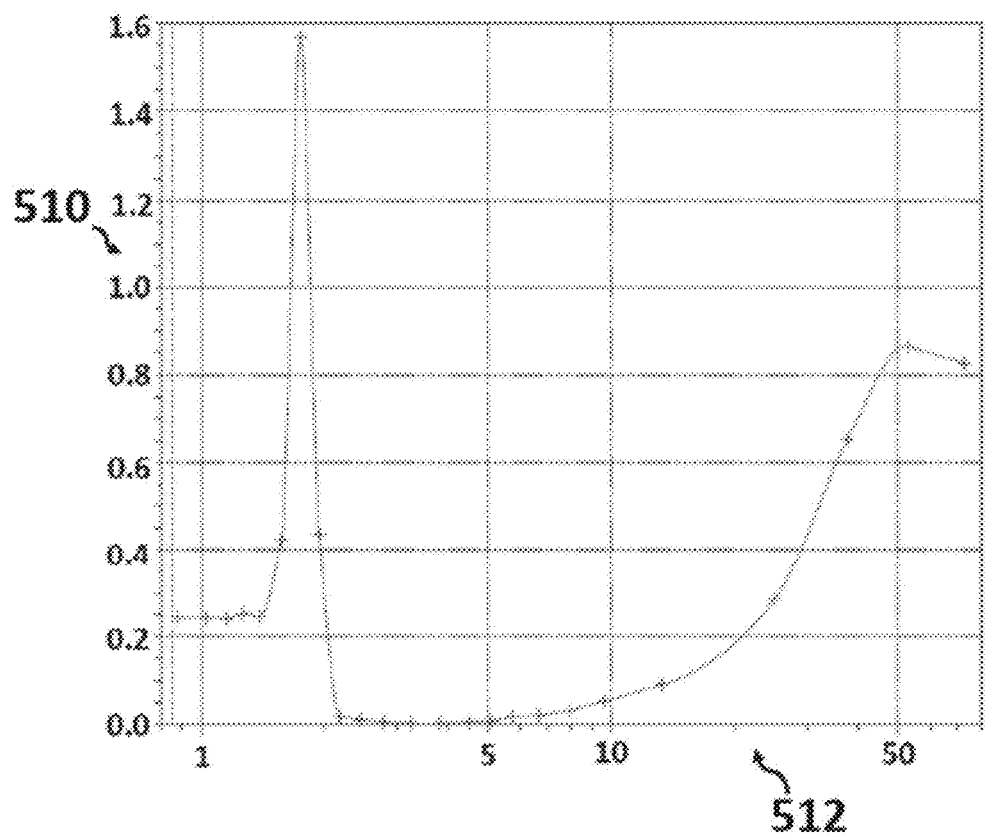
FIG. 5B shows the BJH pore size distribution of pure electrospun Fe/carbon fibrous mats. The vertical axis 510 denotes dV/d log(r) Pore Volume (cm$^3$ g$^{-1}$ nm$^{-1}$). The horizontal axis 512 denotes pore size (nm).
Figure 6A:
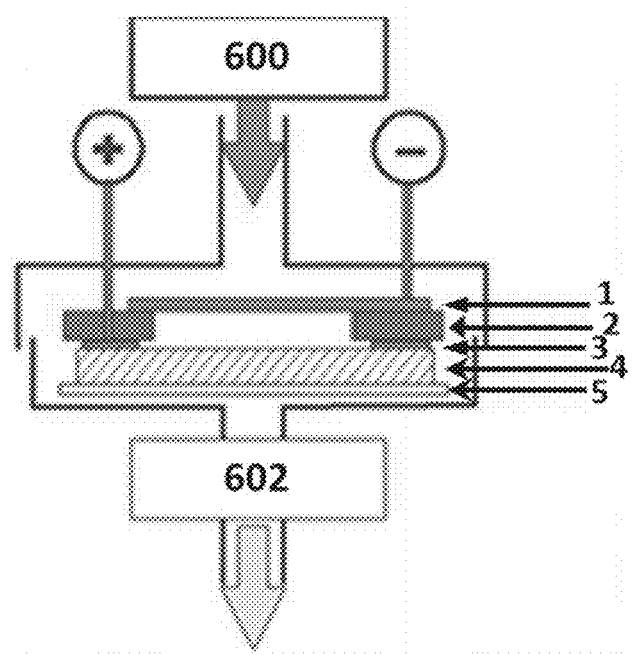
FIG. 6A shows a schematic structure of an electrochemical filter which consists of a perforated titanium shim cathode 1, an insulating silicone rubber separator and seal 2, a titanium anodic ring 3, a carbon fibrous anodic filter 4, and a polytetrafluoroethylene (PTFE) membrane support 5. The influent is denoted 600 and effluent is denoted by 602.
Figure 6B:
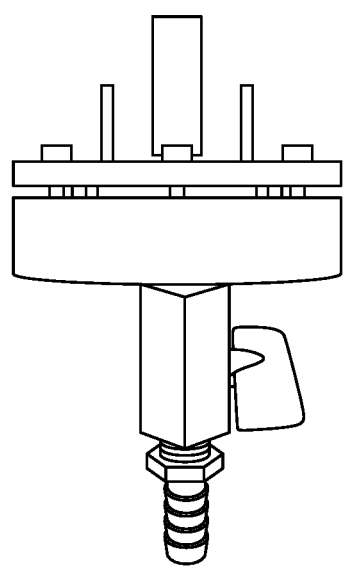
FIG. 6B is a digital picture of the electrochemical filtration setup.
Figure 6C:
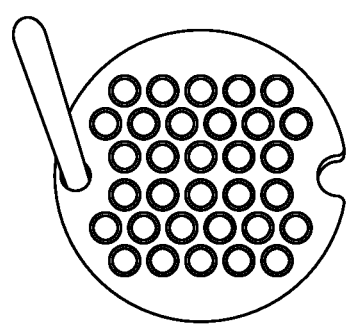
FIG. 6C shows the perforated titanium shim cathode.
Figure 6D:
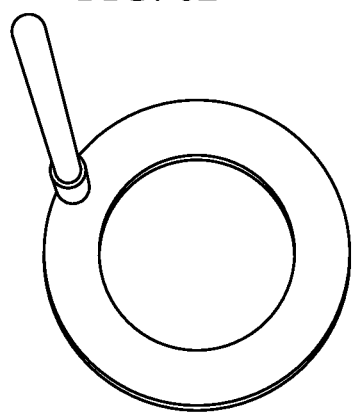
FIG. 6D shows the titanium anodic ring.
Figure 6E:
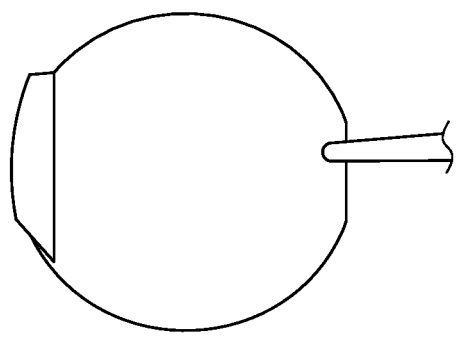
FIG. 6E shows the present hybrid porous carbon fibrous filter operable as the carbon fibrous anodic filter in the electrochemical filter of FIGS. 6A and 6B.
Figure 6F:
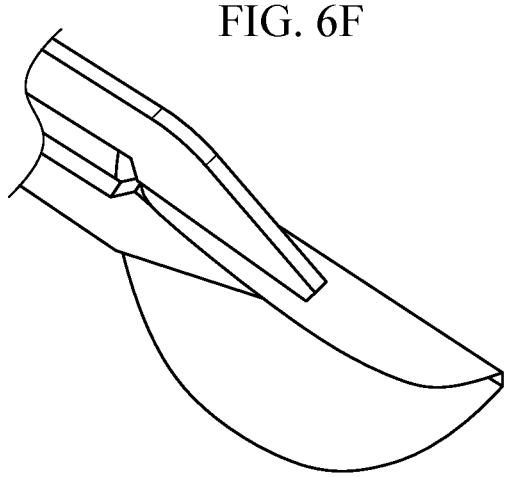
FIG. 6F shows the flipped side of the hybrid porous carbon fibrous filter of FIG. 6E, demonstrating its flexibility without being damaged.
Figure 6G:
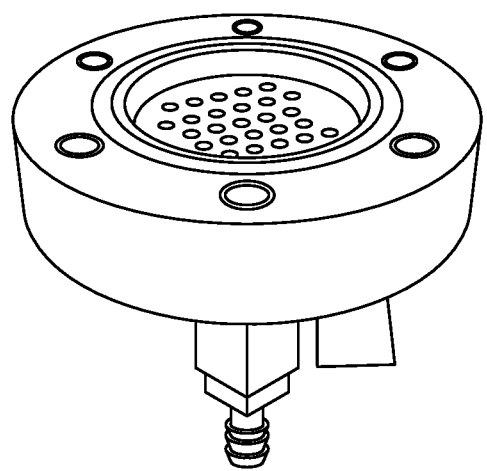
FIG. 6G shows the electrochemical filtration device with a plastic shim plate at the bottom.
Figure 6H:
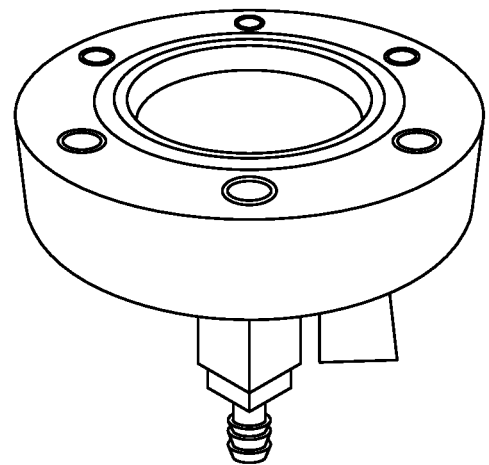
FIG. 6H shows the electrochemical filtration device with the hybrid porous carbon fibrous filter membrane on top of the plastic shim plate.
Figure 6I:
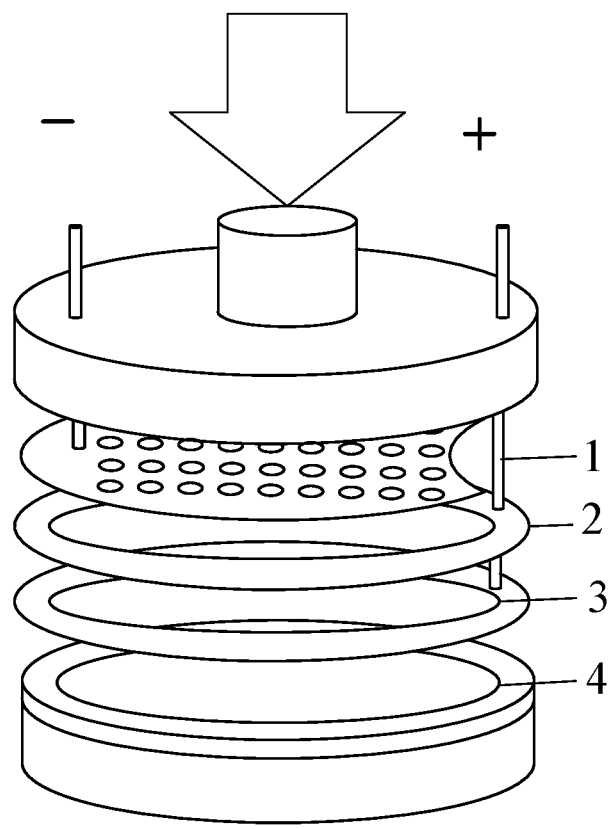
FIG. 6I is another schematic diagram of the electrochemical filter shown in FIGS. 6A and 6B, wherein the components herein are shown to be separated. The same reference numeral denotes the same components, including the perforated titanium shim cathode 1, the insulating silicone rubber separator and seal 2, the titanium anodic ring 3, and the carbon fibrous anodic filter 4.

FIGS. 4A to 4B and 5A to 5B present the $N_2$ adsorption-desorption isotherms and the corresponding Barrett-Joyer-Halenda (BJH) pore size distribution curve for the electrospun carbon fibrous mats with and without ZIF-8 particles. As shown in FIG. 4A, the hybrid porous carbon fibrous mat exhibits a type-IV curve with a hysteresis loop in the range of $P/P_0$=0.4-1, which is characteristic of mesoporous materials. The material exhibits a high Brunauer-Emmett-Teller (BET) surface area of 447 m$^2$/g with a high total pore volume of 2.91 cm$^3$/g, in which the micropore volume is 0.287 cm$^3$/g. According to the BJH model (FIG. 4B), this material possesses plenty of micropores centered at 1 nm and mesopores with a maximum diameter frequency near 30 nm. In comparison, the pure electrospun carbon fibrous mats without MOF particles only exhibit a BET surface area of 164 m$^2$/g, with a total pore volume of 0.65 cm$^3$/g and micropore volume of 0.07 cm$^3$/g (FIG. 5A). The above BET results illustrate that the integration of MOF particles using the present method of alternate electrospinning and electrospraying significantly improves the specific surface area and porosity of the electrospun carbon fibrous mats, which are advantageous for water treatment applications.

Figure 7A:
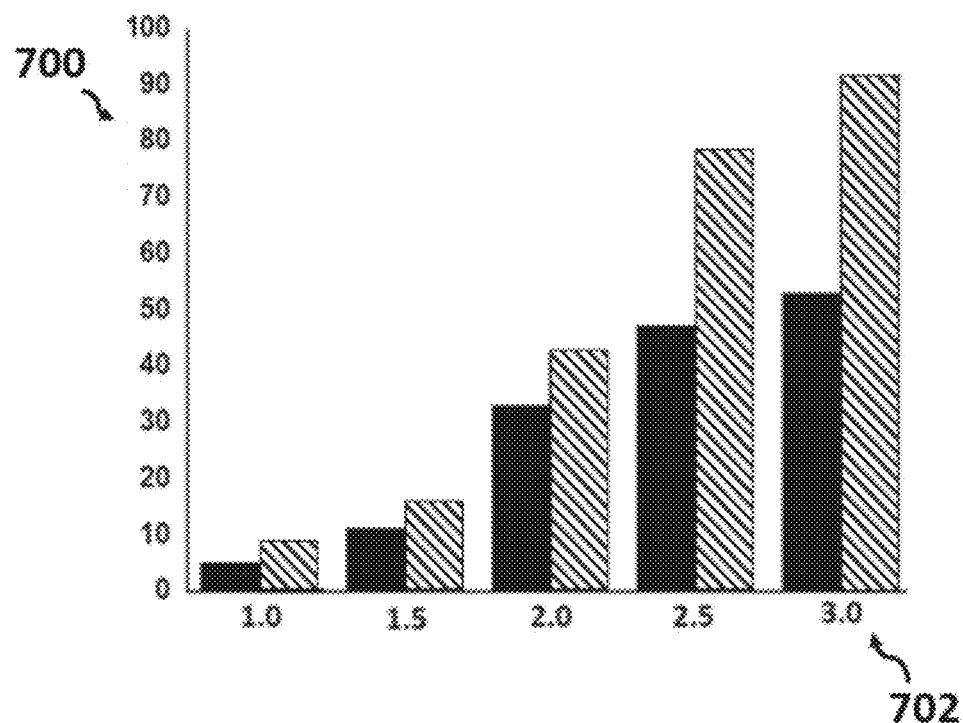
FIG. 7A is a comparison of oxidative removal efficiency as a function of applied voltage for 0.5 mmol/L methyl orange and 10 mmol/L sodium sulfate solution using (i) the present electrospun Fe/carbon fibrous mats with ZIF-8-derived porous carbon (denoted by shaded bars) and (ii) electrospun Fe/carbon fibrous mats without ZIF-8-derived porous carbon (denoted by black bars). The vertical axis 700 denotes removal efficiency (%). The horizontal axis 702 denotes applied voltage (V).
Figure 7B:
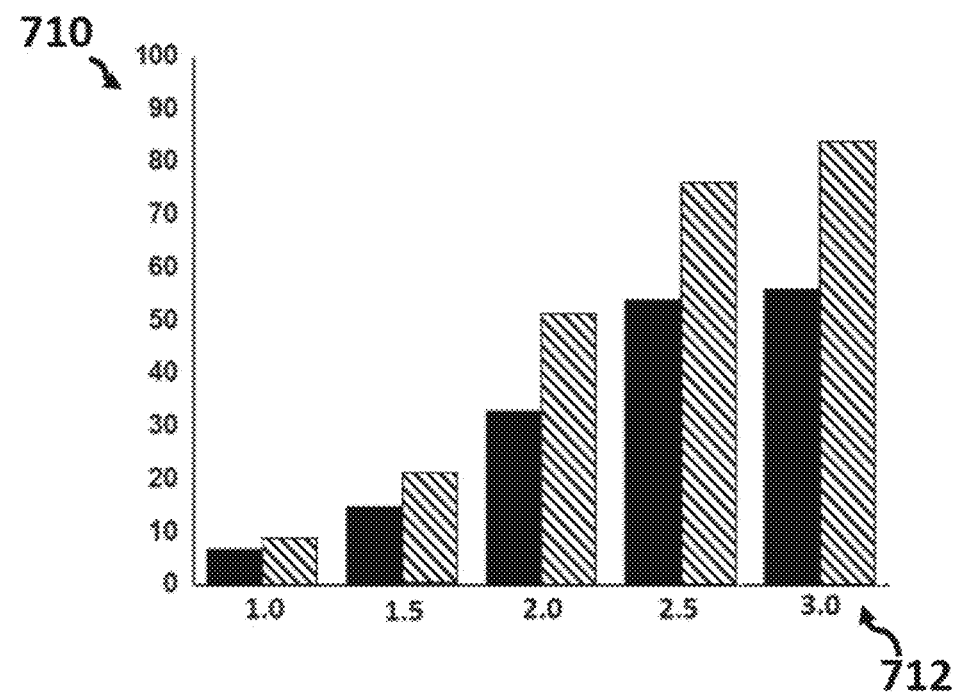
FIG. 7B is a comparison of oxidative removal efficiency as a function of applied voltage for 0.5 mmol/L phenol and 10 mmol/L sodium sulfate solution using (i) the present electrospun Fe/carbon fibrous mats with ZIF-8-derived porous carbon (denoted by shaded bars) and (ii) electrospun Fe/carbon fibrous mats without ZIF-8-derived porous carbon (denoted by black bars). The vertical axis 710 denotes removal efficiency (%). The horizontal axis 712 denotes applied voltage (V).
Figure 7C:
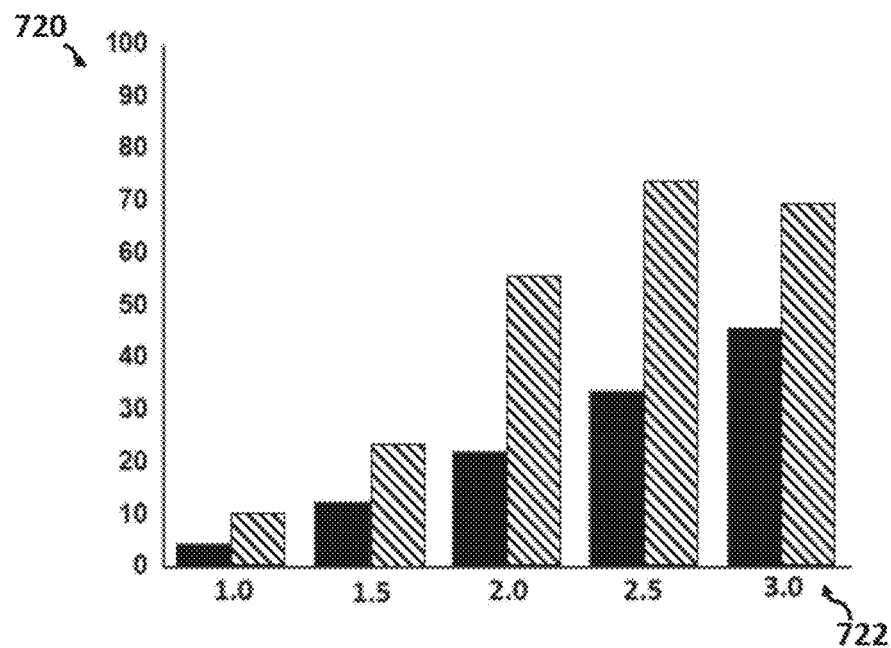
FIG. 7C is a comparison of oxidative removal efficiency as a function of applied voltage for 0.5 mmol/L tetracycline and 10 mmol/L sodium sulfate solution using (i) the present electrospun Fe/carbon fibrous mats with ZIF-8-derived porous carbon (denoted by shaded bars) and (ii) electrospun Fe/carbon fibrous mats without ZIF-8-derived porous carbon (denoted by black bars). The vertical axis 720 denotes removal efficiency (%). The horizontal axis 722 denotes applied voltage (V).

To evaluate the removal efficiency of the hybrid porous carbon fibrous mats towards small organic compounds, methyl orange (a common azo-dye), phenol (a common organic compound in industrial wastewater and present at superfund sites) and tetracycline (a common antibiotic released from wastewater treatment plant) were investigated, respectively. The electrospun Fe-doped carbon fibrous mats with and without ZIF-8-derived porous carbon particles were studied comparatively. All the experiments were conducted after the adsorption saturation was achieved in order to eliminate the contribution of adsorption on the compounds removal. FIG. 6A to 6I show the structure of the electrochemical filter setup and the various components, which employs a perforated titanium shim 1 as cathode and a titanium ring 3 with a carbon fibrous filter 4 as anode. As shown in FIG. 7A to 7C, at any voltage applied, the hybrid carbon fibrous filter integrated with MOF-derived porous carbon particles is able to demonstrate enhanced removal efficiency compared with that of the pure electrospun carbon fibrous mat filter. This can be attributed to the enhanced specific surface area (447 vs. 164 $m^2/g$) and total pore volume (2.91 vs. 0.65 $cm^3/g$) of the hybrid porous carbon fibrous mats. The removal performance towards the selected organic compounds is increased with increasing applied voltage and reached an optimal value at 2.5 or 3 V. The removal efficiency of the present hybrid porous carbon fibrous electrochemical filter towards methyl orange, phenol and tetracycline can reach at least 91%, 83% and 73%, respectively, showing great promise for water treatment and environmental applications.

Example 8: Potential and Commercial Applications

The presently developed free-standing hybrid porous carbon fibrous mats combine the outstanding features of high specific surface area, total pore volume, good electrical conductivity, mechanical property, thereby demonstrating significant potential for diverse applications in energy and environment fields.

Compared with conventional electrochemical filters based on graphene and carbon nanotubes which are expensive, fragile and may easily be released into water bodies, the conductive hybrid porous carbon fibrous mats of present disclosure are safe, mechanically stable and cost-effective.

Operating the presently developed porous carbon fibrous mats as an electrochemical filter to remove aqueous organic contaminants requires much lower energy consumption (0.084 $kWh/m^3$) than conventional electrochemical oxidation processes (1-10 kW $hr/m^3$).

The composition of the developed hybrid porous carbon mats is conveniently tunable for diverse applications by using different kinds of MOF particles and introduction of various metal precursors into the electrospun fibers.

The fabrication process is facile and scalable, can be extended to include use of other porous additives to fabricate various hybrid porous carbon fibrous materials for broader applications.

The present fibrous mats can be applied or operable as a binder-free electrode materials for electrochemical water treatment, as a gas scavenger to absorb and react with certain gas to extend the shelf life of food in food packaging, and as a binder-free electrode materials in batteries, supercapacitors and/or fuel cells.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A method of producing a porous carbon composite fibrous mats comprised of a network of carbon fibers incorporated with porous carbon particles, the method comprising:
electrospinning a polymer solution to form a porous layer of polymeric fibers and the polymeric fibers are doped with a precursor of conductive metal particles, wherein the polymer solution comprises a polymer and the precursor of the conductive metal particles;
electrospraying a metal organic framework suspension onto the porous layer of polymeric fibers, wherein the metal organic framework suspension comprises metal organic framework particles;
repeating the electrospinning and electrospraying in an alternating manner to form a porous network of polymeric fibers incorporated with the metal organic framework particles; and
heating the porous network of polymeric fibers incorporated with the metal organic framework particles to form the porous carbon composite fibrous mats.

2. The method of claim 1, wherein electrospinning the polymer solution comprises mixing the polymer and the precursor of conductive metal particles in an organic solvent to form the polymer solution.

3. The method of claim 1, wherein the polymer comprises polyacrylonitrile, phenolic resins, polypyrrole, polystyrene, polymethylacrylonitrile, polyaromatic hydrocarbons, biomass-derived polymers, or a combination thereof.

4. The method of claim 1, wherein the precursor of conductive metal particles comprises tris(acetylacetonato) iron(III), iron(III) acetate, iron(III) nitrate, copper(II) acetate, or copper(II) nitrate.

5. The method of claim 2, wherein the organic solvent comprises N,N-dimethylformamide, acetone, dimethyl sulfoxide, tetrahydrofuran, or ethanol.

6. The method of claim 1, wherein electrospraying the metal organic framework suspension comprises mixing (i) a precursor of the metal organic framework particles and (ii) an alkyl substituted imidazole, a bicyclic imidazole, or a non-substituted imidazole to form the metal organic framework particles.

7. The method of claim 6, wherein the precursor of the metal organic framework particles comprises cobalt chloride, cobalt acetate, cobalt hydroxide, cobalt oxide, cobalt sulfate, cobalt carbonate, cobalt nitrate hexahydrate, zinc chloride, zinc acetate, zinc hydroxide, zinc oxide, zinc sulfate, zinc carbonate, or zinc nitrate hexahydrate.

8. The method of claim 6, wherein the alkyl substituted imidazole comprises 1-methylimidazole, 2-methylimidazole, or 2-ethylimidazole, wherein the bicyclic imidazole comprises benzimidazole.

9. The method of claim 1, wherein the metal organic framework particles comprise a zeolitic imidazolate framework, and wherein the zeolitic imidazolate framework comprises zeolitic imidazolate framework-67 or zeolitic imidazolate framework-8.

10. The method of claim 1, wherein the metal organic framework particles each has a diameter ranging from 20 nm to 10 μm.

11. The method of claim 1, wherein electrospraying the metal organic framework suspension further comprises adding a porous additive to the metal organic framework suspension before electrospraying, wherein the porous additive comprises a metal organic framework, porous coordination polymers, active carbon particles, carbon spheres, zeolites, molecular sieves, microporous phosphates, or a combination thereof.

12. The method of claim 1, wherein heating the porous network of polymeric fibers comprises subjecting the porous network of polymeric fibers incorporated with the metal organic framework particles to pyrolysis at a temperature ranging from 500° C. to 1200° C.

* * * * *